Patented Dec. 12, 1933

1,939,591

UNITED STATES PATENT OFFICE 1,939,591

PURIFICATION OF PHENOLIC BODIES

Clyde O. Henke, South Milwaukee, Wis., assignor to E. I. du Pont de Nemours & Company, Wilmington, Del., a corporation of Delaware No Drawing. Application October 26, 1931
Serial No. 571,292

15 Claims. (Cl. 260—154)

This invention relates to the purification of phenolic bodies. It is an object of this invention to provide a method for purifying phenolic bodies, particularly cresols, whereby to eliminate therefrom catalyzer poisons and to render the same susceptible of hydrogenation by means of hydrogen under pressure in the presence of a catalyst. Other and further objects of this invention will appear as the description proceeds.

It is well known that phenols, particularly cresols or cresylic acid, will not readily lend themselves to hydrogenation by means of hydrogen under pressure in the presence of ordinary nickel catalysts. The explanation for this seems to reside in the fact that phenols, particularly cresols or cresylic acid as obtained from coal tar contain various impurities which act as catalyzer poisons. These impurities are generally presumed to be sulfur compounds of the thiophenol and thiophene series. Ordinary methods of purification, such as fractional distillation, do not eliminate these catalyzer poisons. Thus, cresylic acid, which is a mixture of o-, m-, and p-cresols, and some xylenols, may be fractionated until a fraction is obtained having a very limited boiling range, indicating that one of said isomers has been isolated in substantially pure form. However, the fraction thus obtained is not susceptible to hydrogenation by the aid of nickel catalysts with any greater facility than the original mixture.

I have now found that cresols can be very effectively rid of their catalyzer poisons by extraction with sulfuric acid. According to my invention I agitate the cresols or cresylic acid once or twice with sulfuric acid, and then permit the mixture to settle into layers. The upper layer containing the cresols may then be drawn off and washed with water to remove traces of acid, and then desiccated in any suitable manner, for instance by partial evaporation. The cresol body thus obtained is substantially free of catalyzer poisons and can be readily hydrogenated by the aid of nickel catalysts and hydrogen to produce methyl-cyclohexanol.

Various strengths of sulfuric acid may be used for said purpose. However, where concentrated sulfuric acid is used, the losses of cresol by sulfonation become appreciable. It is therefore advisable to use sulfuric acid of not higher than 100% strength. Similarly, for practical reasons it is preferable not to use a concentration less than 50%. The optimum conditions seem to lie in a sulfuric acid concentration of about 78–80% (60° Bé.).

The proportion of sulfuric acid to cresol should preferably be kept low, to avoid too much sulfonation. In my preferred practice I use 10 to 30 parts of sulfuric acid to 100 parts of cresol. To increase the effectiveness, the process is preferably repeated, rather than adding a large quantity of sulfuric acid at once.

The temperature of the treatment should preferably be kept below 35° C.; best results are obtained at room temperature or lower. Elevated temperatures favor sulfonation, and thus occasion loss of the cresol body.

My novel process may be applied to any individual cresol or to cresylic acid, which is a mixture of the three cresols with some xylenols. In the latter case, although the boiling range of the purified mixture is still very wide, it will readily become hydrogenated with hydrogen under pressure in the presence of nickel catalysts. My process is also applicable to other phenols, for instance phenol itself ($C_6H_5.OH$), although in the latter case the process is not of great commercial significance, since phenol may be prepared synthetically in a pure state substantially free of catalyzer poisons.

Without limiting my invention to any particular procedure, the following examples are given to illustrate my preferred mode of operation. Parts given are parts by weight.

*Example.—Purification of cresylic acid*

50 parts of technical cresylic acid are charged into a container fitted with a lead covered agitator, and cooled to about 15 to 25° C. 8 parts of 60° Bé. sulfuric acid are added, and the mass agitated at 15 to 25° C. for about 20 hours. It is then allowed to settle, and the lower, acid layer is siphoned out and discarded. Additional 8 parts of 60° Bé. sulfuric acid are now introduced and the mass is agitated as before for about 20 hours. The mass is now again allowed to settle into layers and the lower acid layer is withdrawn, 16 parts of water are now added, and the mixture agitated for about 1 hour, allowed to settle, and the lower, aqueous, acid layer is withdrawn. This washing procedure is repeated with 10 parts of water. Finally, 16 parts of water and ¼ to ½ parts of caustic soda are added and the mixture stirred for 1 hour. The mass is allowed to settle, and the cresylic acid, which this time forms the lower layer, is separated and fractionally distilled under vacuum. The distillate is divided into fractions as follows:

Cut 1 = about 30% of the mass being distilled.
Cut 2 = about 65% of the mass being distilled.

Residue = about 3% of the mass being distilled.

The middle fraction (cut 2) is directly suitable for hydrogenation in the presence of nickel catalyst. The first fraction (cut 1) settles out into a water layer and a cresylic acid layer. The latter may be withdrawn and added to the next distillation batch.

The yield of purified cresol by this method is about 86% of the initial material.

When this product is subjected to hydrogenation according to the usual procedure, using reduced nickel as catalyst, it is converted into methyl-cyclohexanol in practically quantitative yield.

It will be understood that many variations and modifications are possible in my preferred procedure without departing from the spirit of this invention.

I claim:

1. The process of purifying a phenol which is obtainable from coal tar to eliminate therefrom catalyzer poisons, which comprises extracting the catalyzer poisons with sulfuric acid.

2. The process of purifying a homolog of phenol to eliminate therefrom catalyzer poisons, which comprises extracting the catalyzer poisons with a quantity of sulfuric acid insufficient to dissolve said homolog of phenol or to effect appreciable sulfonation thereof.

3. The process of purifying cresylic acid to eliminate therefrom catalyzer poisons, which comprises extracting the catalyzer poisons with sulfuric acid.

4. In the process of purifying a cresol which is obtainable from coal tar to render the same susceptible of hydrogenation by the aid of nickel catalysts, the step which comprises agitating the same with sulfuric acid under conditions milder than those leading to substantial sulfonation.

5. The process of purifying a cresol which is obtainable from coal tar to render the same susceptible of hydrogenation by the aid of nickel catalysts, which comprises agitating the same with sulfuric acid of 50 to 100% strength and at a temperature not above 35° C., allowing the mass to settle into layers, and withdrawing the acid layer.

6. The process of purifying a cresol which is obtainable from coal tar to render the same susceptible of hydrogenation by the aid of nickel catalysts, which comprises agitating the same with sulfuric acid of 50 to 100% strength and at a temperature not above 35° C., allowing the mass to settle into layers, withdrawing the acid layer, washing the cresol layer with water and finally separating the cresol body from the aqueous solution.

7. The process of purifying a cresol which is obtainable from coal tar to render the same susceptible of hydrogenation by the aid of nickel catalysts, which comprises agitating the same with sulfuric acid of 50 to 100% strength and at a temperature not above 35° C., allowing the mass to settle into layers, withdrawing the acid layer, washing the cresol layer with water, separating the cresol body from the aqueous solution, and finally desiccating the cresol body.

8. The process of purifying a cresol which is obtainable from coal tar to render the same susceptible of hydrogenation by the aid of nickel catalysts, which comprises agitating the same with sulfuric acid of 50 to 100% strength and at a temperature not above 35° C. allowing the mass to settle into layers, withdrawing the acid layer, washing the cresol layer with water, separating the cresol body from the aqueous solution, distilling the cresol body, and recovering a middle fraction free from water.

9. The process of purifying a liquid phenol to eliminate therefrom catalyzer poisons, which comprises extracting the catalyzer poisons with a quantity of sulfuric acid insufficient to dissolve said phenol or to effect appreciable sulfonation thereof.

10. The process of purifying a liquid phenol to eliminate therefrom catalyzer poisons, which comprises extracting the catalyzer poisons with sulfuric acid without changing the chemical identity of the phenol throughout the treatment.

11. The process of purifying a liquid phenol to eliminate therefrom catalyzer poisons, which comprises extracting the catalyzer poisons with sulfuric acid at a temperature not exceeding 35° C., and in the absence of agents capable of reacting with the phenol.

12. The process of purifying a liquid phenol to eliminate therefrom catalyzer poisons, which comprises extracting the catalyzer poisons with a quantity of sulfuric acid not exceeding 30% of the weight of the phenol, and at a temperature not exceeding 35° C.

13. The process of purifying a homolog of phenol to eliminate therefrom catalyzer poisons, which comprises agitating substantially 100 parts of said homolog of phenol with 10 to 30 parts of sulfuric acid of 50 to 100% strength, and at a temperature not exceeding 35° C.

14. The process of purifying a homolog of phenol to eliminate therefrom catalyzer poisons, which comprises agitating substantially 100 parts of said homolog of phenol with 10 to 30 parts of sulfuric acid of 50 to 100% strength, and at a temperature not exceeding 35° C., allowing the mass to separate into layers, and recovering the phenolic layer free of sulfuric acid.

15. The process of purifying a homolog of phenol to eliminate therefrom catalyzer poisons, which comprises agitating substantially 100 parts of said homolog of phenol with 10 to 30 parts of sulfuric acid of 50 to 100% strength, and at a temperature not exceeding 35° C., allowing the mass to separate into layers, separating the sulfuric acid from the phenolic layer, washing the latter with water and dilute caustic alkali, and finally subjecting the phenolic layer to fractional distillation under a vacuum, and isolating a middle fraction thereof.

CLYDE O. HENKE.